United States Patent
Yi

(10) Patent No.: US 9,511,273 B2
(45) Date of Patent: Dec. 6, 2016

(54) SLIDING SNOW DEVICE

(71) Applicant: Ji Ha Yi, Ulsan (KR)

(72) Inventor: Ji Ha Yi, Ulsan (KR)

(73) Assignee: Ji Ha Yi, Ulsan (KR)

( * ) Notice: Subject to any disclaimer, the term of this patent is extended or adjusted under 35 U.S.C. 154(b) by 0 days.

(21) Appl. No.: 14/442,755

(22) PCT Filed: Nov. 14, 2013

(86) PCT No.: PCT/KR2013/010364
§ 371 (c)(1),
(2) Date: Aug. 19, 2015

(87) PCT Pub. No.: WO2014/077609
PCT Pub. Date: May 22, 2014

(65) Prior Publication Data
US 2015/0375086 A1 Dec. 31, 2015

(30) Foreign Application Priority Data

Nov. 14, 2012 (KR) .......................... 10-2012-0128591

(51) Int. Cl.
*A63C 5/03* (2006.01)
*A63C 5/00* (2006.01)
(Continued)

(52) U.S. Cl.
CPC . *A63C 5/03* (2013.01); *A63C 5/00* (2013.01); *A63C 5/003* (2013.01); *A63C 5/044* (2013.01);
(Continued)

(58) Field of Classification Search
CPC .............. A63C 5/12; A63C 5/00; A63C 5/03; A63C 5/003; A63C 5/0405; A63C 5/052; A63C 5/006; A63C 5/0434
(Continued)

(56) References Cited

U.S. PATENT DOCUMENTS 3,295,859 A * 1/1967 Perry .................. A63C 5/0422
280/601
3,724,866 A * 4/1973 Kaplan .................... A63C 5/03
280/11.3
(Continued)

FOREIGN PATENT DOCUMENTS

DE 2556392 A1 * 6/1977 ............. A63C 5/052
DE 3414440 A1 * 10/1985 ............. A63C 5/048
(Continued)

OTHER PUBLICATIONS

Lund, Morten and Masia, Seth; "A Short History of Skis", Int'l Skiing History Assoc.; retrieved from www.skiinghistory.org/history/short-history-skis on Nov. 27, 2015.*
(Continued)

*Primary Examiner* — Paul N Dickson
*Assistant Examiner* — Steve Clemmons
(74) *Attorney, Agent, or Firm* — Paratus Law Group, PLLC

(57) ABSTRACT

Disclosed is a snow sliding apparatus that enables sliding on the snow surface and consists of the body in a flat form that is extended in one direction, the nose and the tail that are bent and extended from both ends of the body in a direction away from the ground surface, and the first concavo-convex part where part of the nose or the tail converges into the inner side. This invention allows the user to control the degree of friction against the snow surface by using the first concavo-convex part that is formed on either side of the nose or the tail of the snow sliding apparatus, enabling the user of the snow sliding apparatus various techniques and shortening the braking distance.

7 Claims, 9 Drawing Sheets

(51) Int. Cl.
   *A63C 5/04* (2006.01)
   *A63C 5/052* (2006.01)
   *B62B 17/02* (2006.01)
   *A63C 5/044* (2006.01)
   *B62B 13/00* (2006.01)

(52) U.S. Cl.
   CPC ............ *A63C 5/0405* (2013.01); *A63C 5/052* (2013.01); *B62B 13/00* (2013.01); *B62B 17/02* (2013.01)

(58) Field of Classification Search
   USPC ........... 280/14.1, 14.21, 14.22, 15, 18, 601, 602, 280/607, 609
   See application file for complete search history.

(56) References Cited

U.S. PATENT DOCUMENTS

| | | | | |
|---|---|---|---|---|
| D227,490 S | * | 6/1973 | Kaplan | D21/766 |
| 3,933,360 A | * | 1/1976 | Arai | A63C 5/052 |
| | | | | 280/609 |
| 4,188,046 A | * | 2/1980 | Fleckenstein | A63C 5/00 |
| | | | | 280/600 |
| 4,533,150 A | * | 8/1985 | Hardy | A63C 5/03 |
| | | | | 280/14.28 |
| 4,678,445 A | * | 7/1987 | Monreal | A63C 5/031 |
| | | | | 280/18 |
| 4,705,291 A | * | 11/1987 | Gauer | A63C 5/00 |
| | | | | 280/601 |
| 4,836,571 A | * | 6/1989 | Corbisiero | A63C 1/26 |
| | | | | 280/600 |
| 4,974,868 A | * | 12/1990 | Morris | A63C 5/03 |
| | | | | 280/14.21 |
| 5,193,839 A | * | 3/1993 | Hannes | A63C 13/005 |
| | | | | 280/600 |
| 5,230,527 A | * | 7/1993 | Varan | A63C 5/00 |
| | | | | 280/609 |
| 5,360,228 A | * | 11/1994 | Palau | A63C 5/062 |
| | | | | 280/601 |
| 5,618,053 A | * | 4/1997 | Moelg | A63C 5/003 |
| | | | | 280/609 |
| 6,082,747 A | * | 7/2000 | Parmentier | A63C 5/03 |
| | | | | 280/14.22 |
| 6,682,083 B2 | * | 1/2004 | Melcher | A63C 5/033 |
| | | | | 280/14.26 |
| 6,945,563 B2 | * | 9/2005 | Clausing | A63C 5/052 |
| | | | | 280/809 |
| D561,860 S | * | 2/2008 | Carlson | D21/760 |
| 7,510,206 B2 | * | 3/2009 | Walker | A63C 5/02 |
| | | | | 280/600 |
| 7,954,841 B2 | * | 6/2011 | Guex | A63C 5/0405 |
| | | | | 280/602 |
| 8,052,165 B2 | * | 11/2011 | Holzer | A63C 5/052 |
| | | | | 280/608 |
| 8,596,667 B1 | * | 12/2013 | Colaianni | A63C 5/006 |
| | | | | 280/609 |
| 8,919,790 B2 | * | 12/2014 | Reguis | A63C 5/0405 |
| | | | | 280/14.21 |
| 2002/0017771 A1 | * | 2/2002 | McManus | A63C 5/02 |
| | | | | 280/600 |
| 2005/0269801 A1 | * | 12/2005 | Carlson | A63C 5/03 |
| | | | | 280/609 |
| 2008/0290621 A1 | * | 11/2008 | Vailli | A63C 5/0405 |
| | | | | 280/14.21 |
| 2009/0102161 A1 | | 4/2009 | Phibbs | |
| 2011/0079986 A1 | * | 4/2011 | Gradman | A63C 5/02 |
| | | | | 280/609 |

FOREIGN PATENT DOCUMENTS

| | | | | |
|---|---|---|---|---|
| FR | 2659564 A1 | * | 9/1991 | ............ A63C 5/03 |
| FR | 2794374 A1 | * | 12/2000 | .......... A63C 5/0405 |
| JP | 03-254772 A | | 11/1991 | |
| KR | 20-0390116 Y1 | | 7/2005 | |
| KR | 20-0445532 Y1 | | 8/2009 | |
| WO | WO 2009-046332 | | 4/2009 | |

OTHER PUBLICATIONS

International Search Report for PCT/KR2013/010364 mailed Feb. 17, 2014 from Korean Intellectual Property Office.

* cited by examiner

FIG. 6
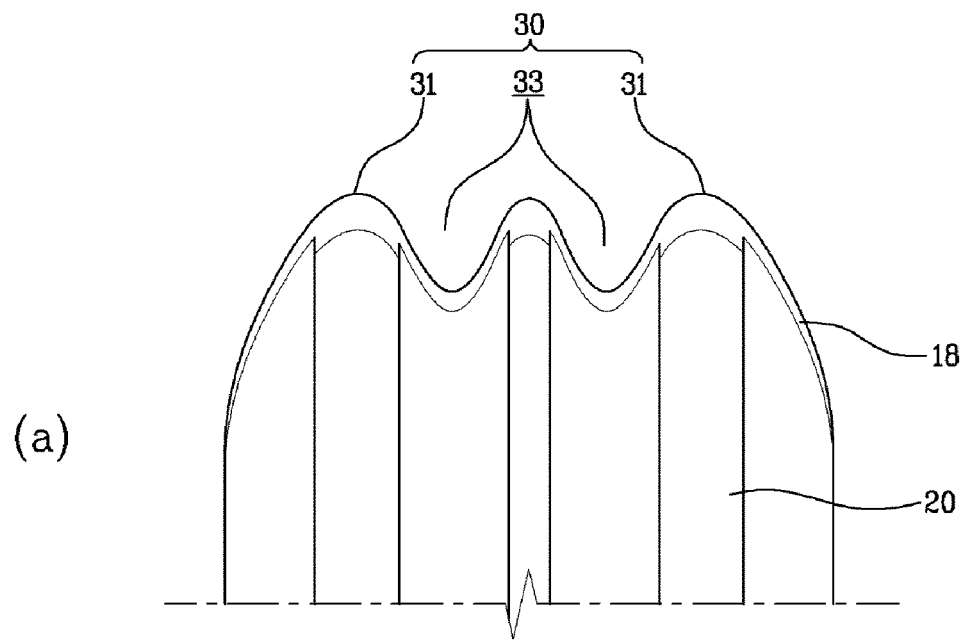
(a)
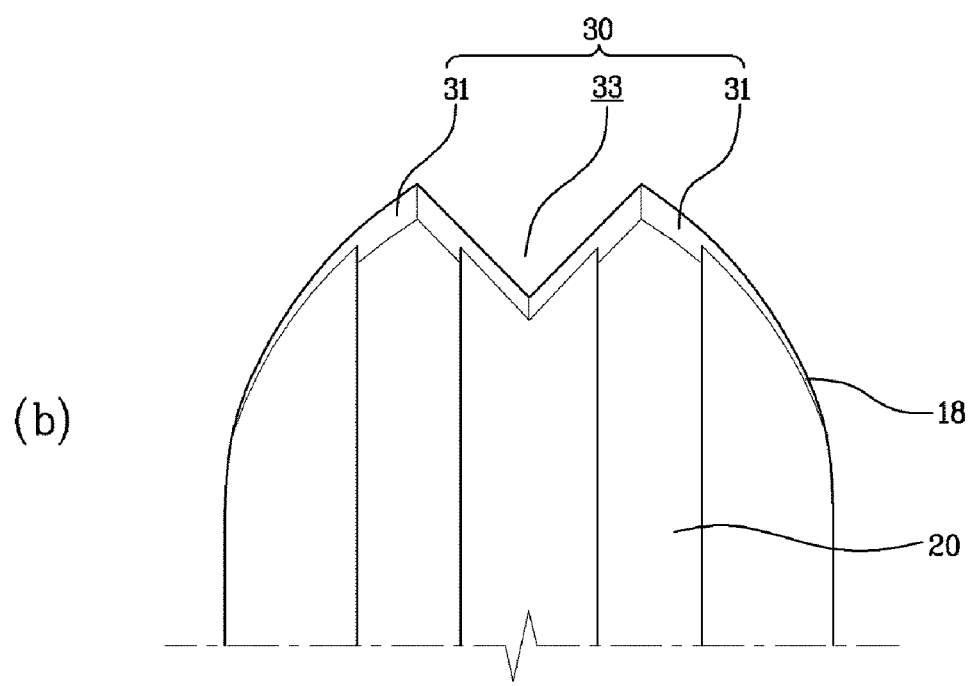
(b)

FIG. 8
(a) 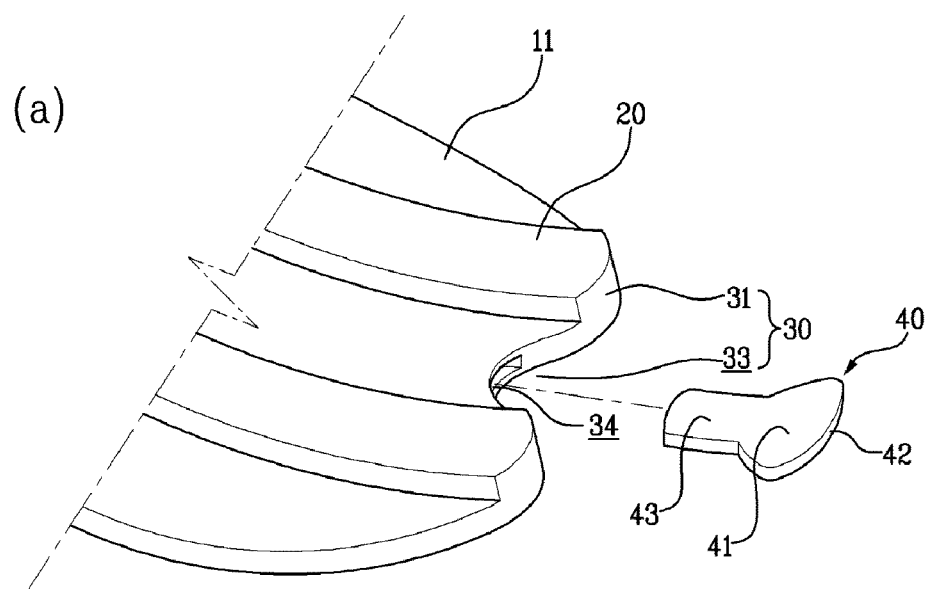
(b) 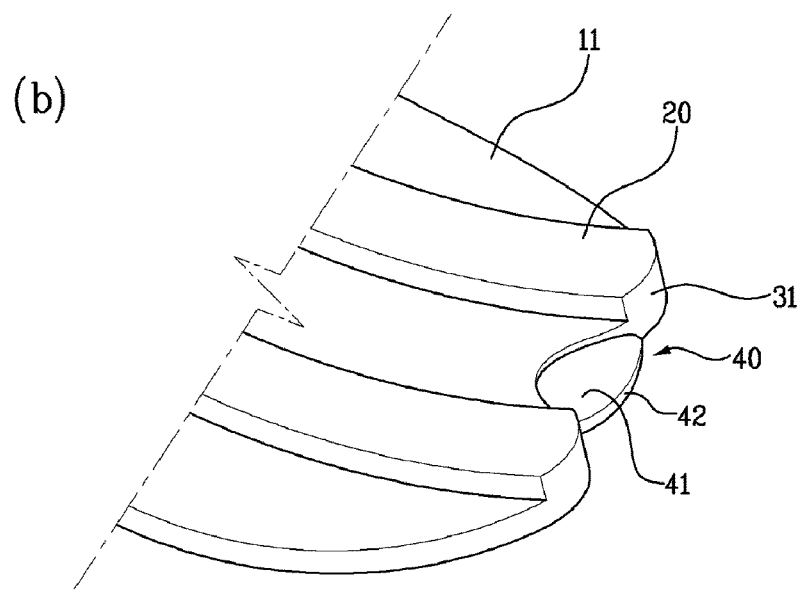

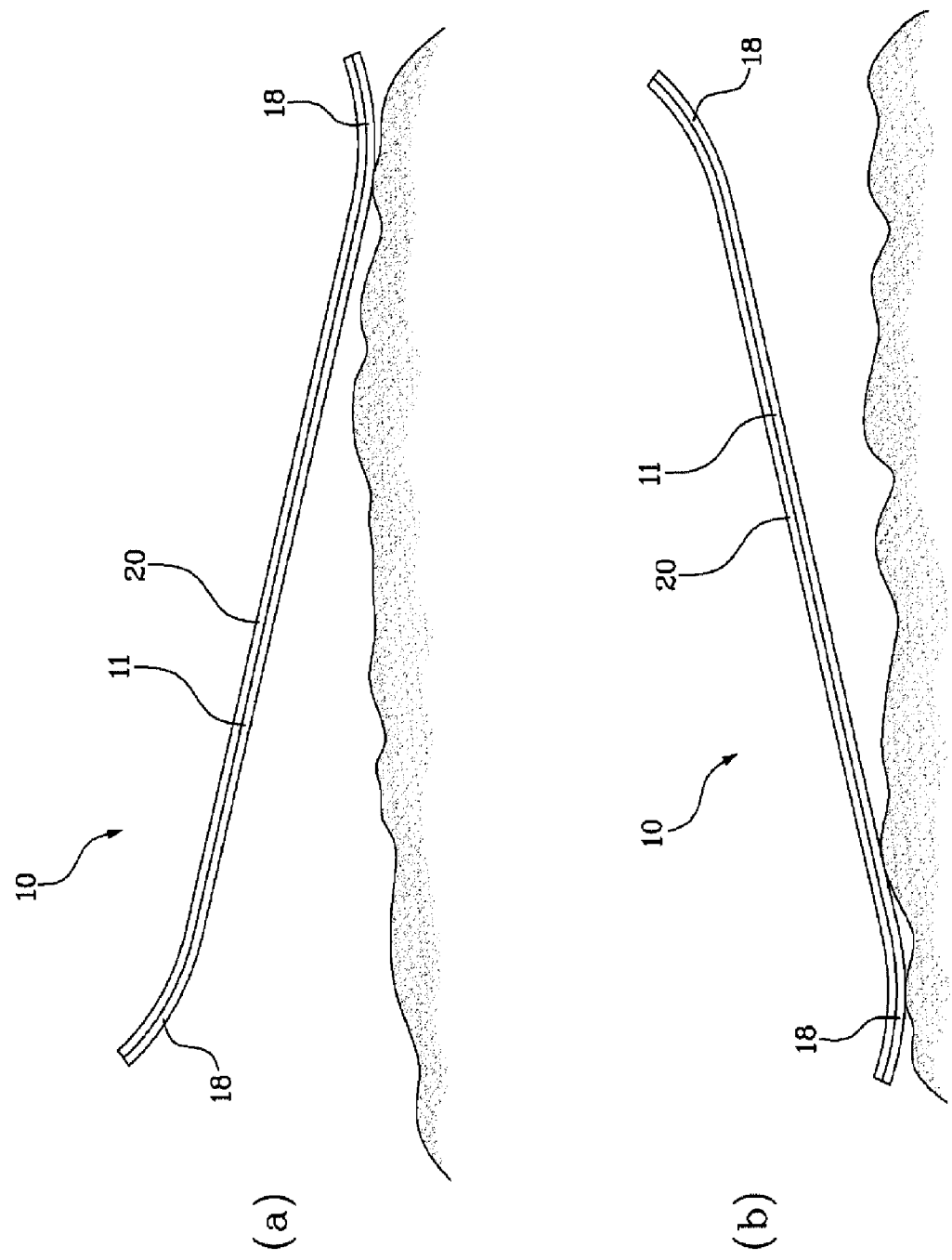

SLIDING SNOW DEVICE

CROSS REFERENCE TO PRIOR APPLICATION

This application is a National Stage Patent Application of PCT International Patent Application No. PCT/KR2013/010364 (filed on Nov. 14, 2013) under 35 U.S.C. §371, which claims priority to Korean Patent Application No. 10-2012-0128591 (filed on Nov. 14, 2012), which are all hereby incorporated by reference in their entirety.

BACKGROUND

The invention relates to a snow sliding apparatus, and more specifically, to a snow sliding apparatus which slides on the snow surface and enables the user to implement more various techniques.

Ski and snowboard represent the sports using the tool enabling sliding on the snow surface. The user puts his feet on each of the skis and controls the direction by using the ski and ski sticks while the snowboard is an apparatus, where the user puts his both feet on a single deck to snowboard.

Also, pieces of equipment have been developed and used recently, where the user puts a short device on his both feet like a ski board without ski sticks.

Among these, the aforementioned short pieces of apparatus like snowboard and ski board have gained a lot of popularity because they enable the use of more various techniques.

Thus, in the case of snow sliding apparatus, it is required to have a relatively short braking distance on the snow surface while enabling the implementation of various techniques.

SUMMARY

The present invention is to solve the problems with existing technologies and aims to provide snow sliding apparatus that enhances braking performance on the snow surface and enables the user to freely control the turning force via enhanced braking performance.

As described above, the snow sliding apparatus of this invention is expected to have the following effects.

In the present invention, the first concavo-convex part that is formed on either side of the nose or the tail of the snow sliding apparatus is used to easily control the degree of friction against the snow surface and the user of this snow sliding apparatus is expected to implement various techniques and have a short braking distance.

Especially, the performance of this snow sliding apparatus can be enhanced because the user can easily control friction against the snow surface by using the first concavo-convex part, more freely control the turning force, and implement more various techniques.

And when the first concavo-convex part is formed on both ends of the nose and the tail of the snow sliding apparatus, same techniques and brake functionalities can be used regardless of directions, which gives more freedom in using the snow sliding apparatus.

Moreover, in the present invention, the user can use advanced techniques more easily and safely because he can ride on objects like handrails or rails by using the first concavo-convex part of this snow sliding apparatus.

BRIEF DESCRIPTION OF THE DRAWINGS

The above and other objects, features and other advantages of the present invention will be more clearly understood from the following detailed description taken in conjunction with the accompanying drawings, in which:

FIG. 6 illustrates plane views of the configuration of other embodiment of the first concavo-convex part comprising the snow sliding apparatus of this invention.

FIG. 8 illustrates perspective views showing the snow sliding apparatus and a dummy spacer coupled with the first concavo-convex part according to third embodiment.

FIG. 9 illustrates illustrative diagrams showing a specific tilt angle on the snow surface of the embodiment of this invention.

DETAILED DESCRIPTION

Hereinafter, specific embodiments of the snow sliding apparatus of this invention shall be explained in detail by using the attached drawings.

Figure 1:
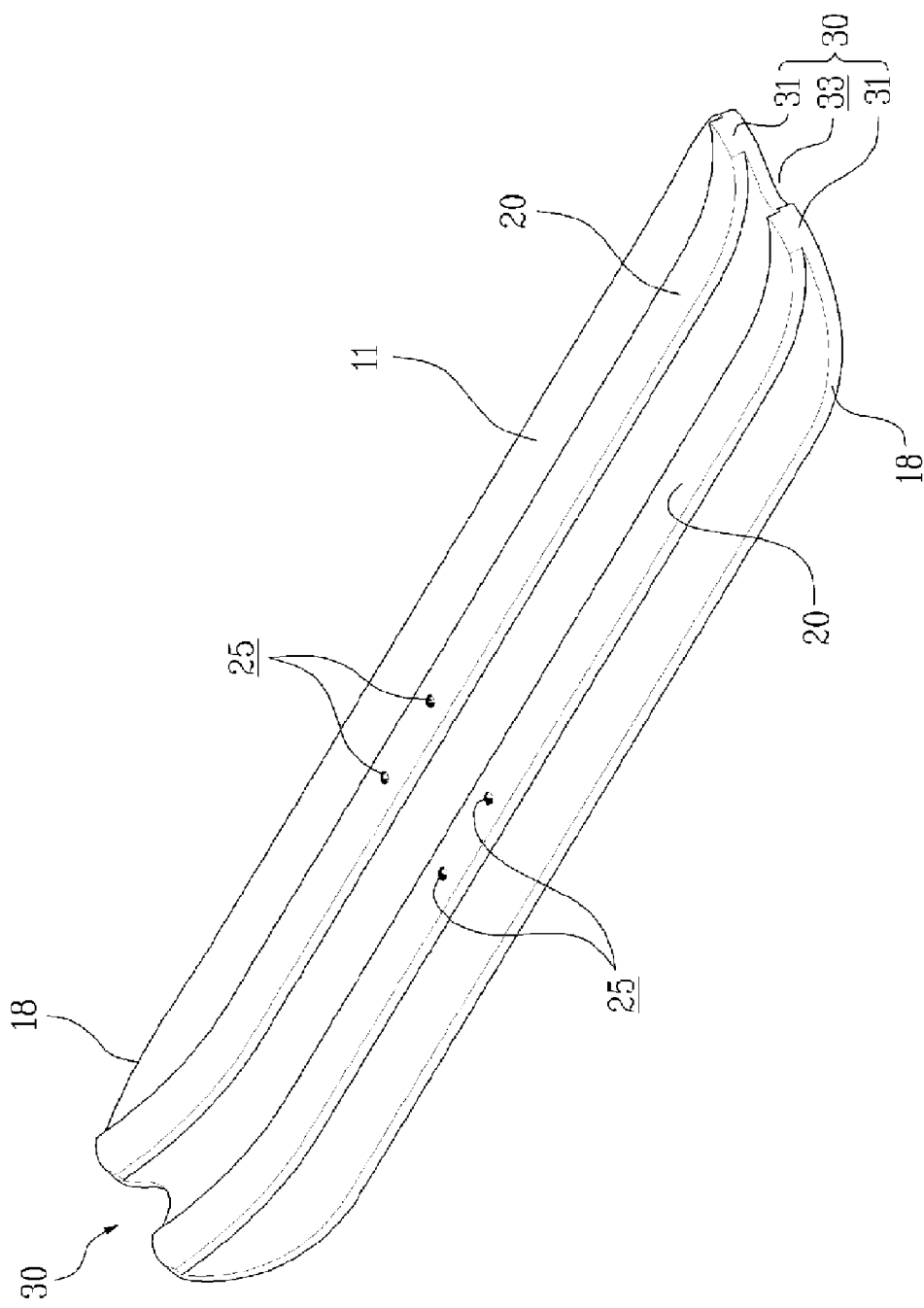
FIG. 1 is a perspective view showing the configuration of the preferred embodiment of the snow sliding apparatus in this invention.
Figure 2:
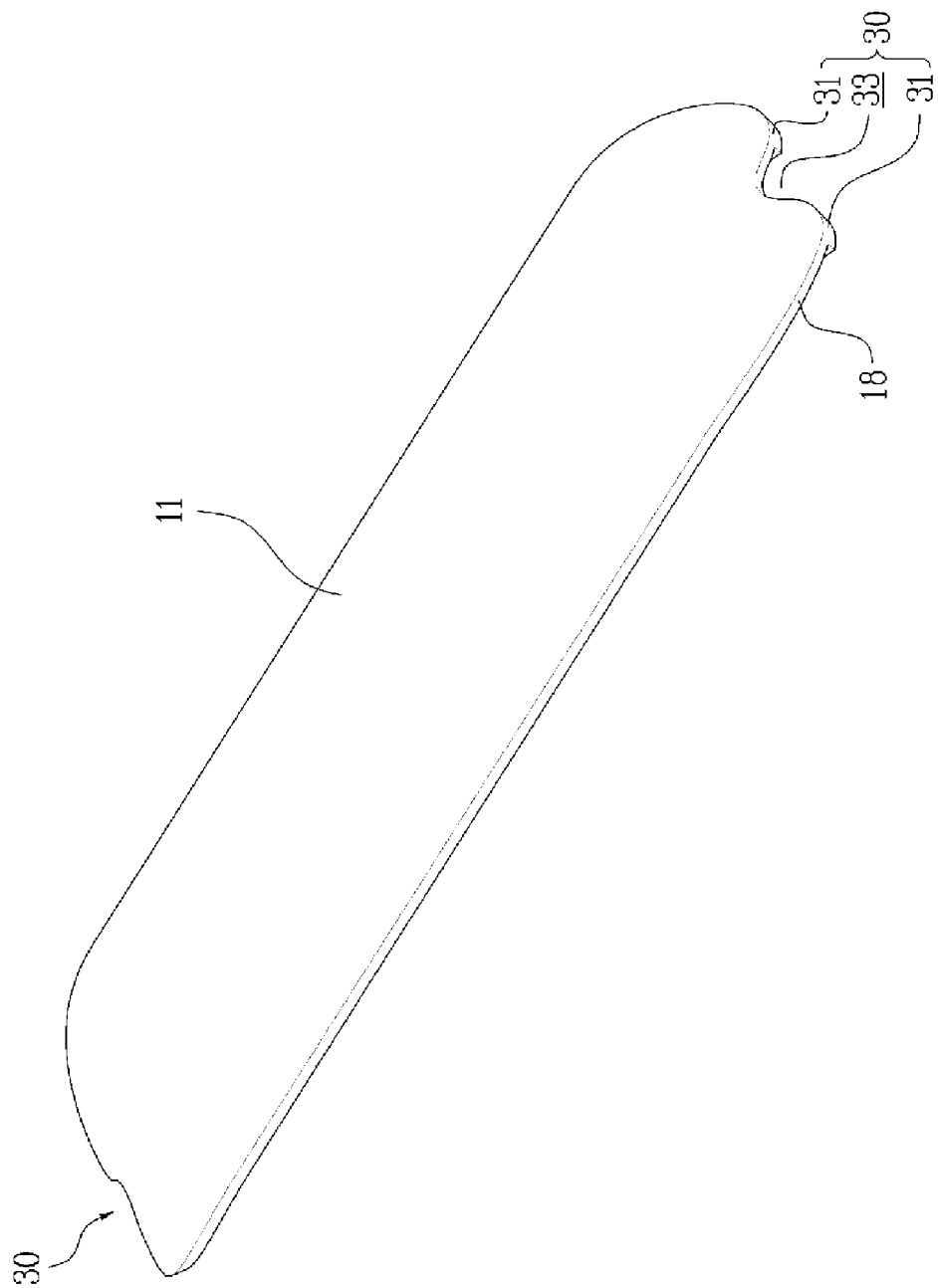
FIG. 2 is a base perspective view showing the configuration of the embodiment of this invention.
Figure 3:
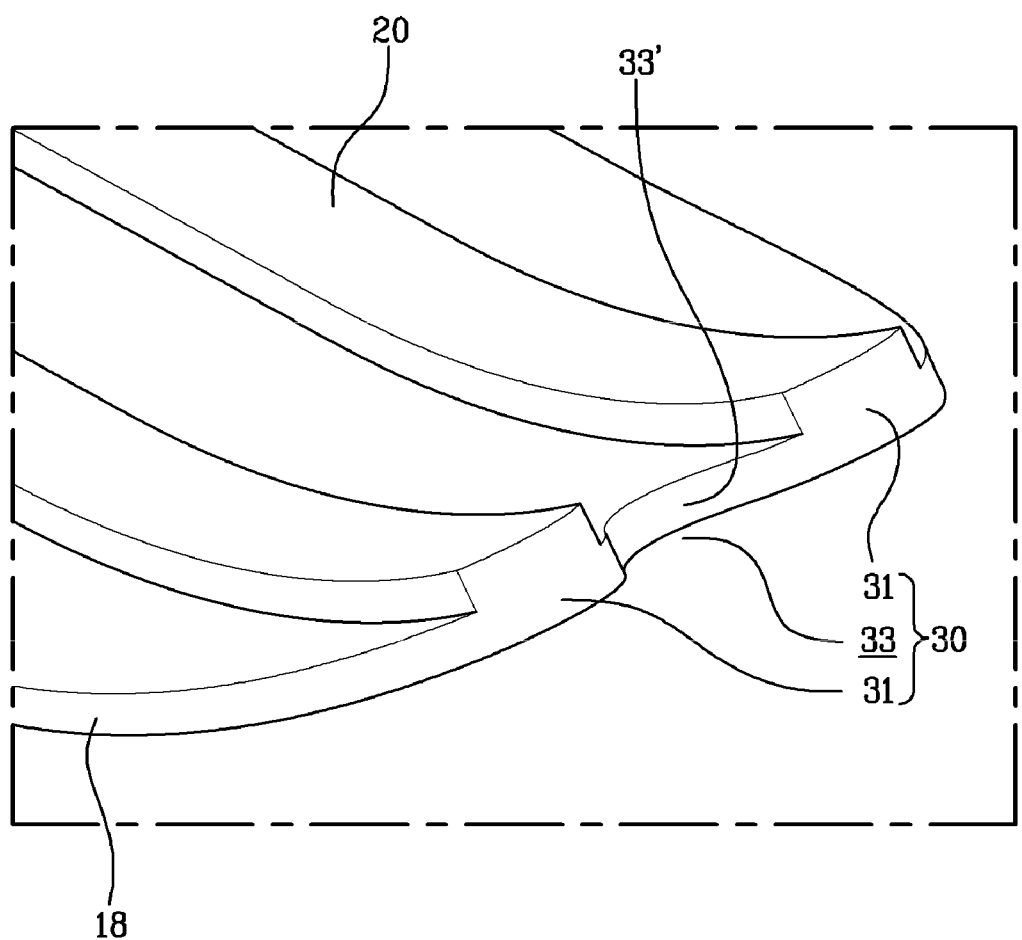
FIG. 3 is a perspective view of the concavo-convex part showing the configuration of the first concavo-convex part comprising the embodiment of this invention.

In FIG. 1, the configuration of the preferred embodiment of the snow sliding apparatus is illustrated in the perspective view. The configuration of the invention embodiment is illustrated in FIG. 2 in the base perspective view.

As shown in these figures, the snow sliding apparatus in this invention enables the user to easily slide on the snow surface and easily turn, brake, and implement various techniques while gliding.

As shown in the FIG. 1, the body (11) of the board on the top plate forms the exterior and skeleton of the snow sliding apparatus in this invention. The body (11) can be made of diverse materials like wood, metal, or alloy and it can be made to extend in one direction in parallel or the center part can be made to bend upwards.

The preferred shape of the body (11) is the one that extends in one direction and has a smooth exterior surface that allows the user to use the lower surface to slide on the snow surface.

The body (11) has the nose (18) and the tail (18) on both ends in a longitudinal direction. The nose (18) and the tail (18) are located on the front and rear parts of the body, respectively, and they are bent and extended in a direction that is away from the ground surface.

The lengths of the nose (18) and the tail (18) and the distance between one bent part to the ground may differ from each other but since the overall shape is similar, same reference numbers are given in this embodiment and explanations are given based on the nose (18).

As the nose (18) and the tail (18) are extended to the bent direction from the body (11), the snow sliding apparatus can be prevented from burrowing into the snow surface and the user can implement diverse techniques regardless of gliding directions.

The top side of the body (11) is equipped with the projected rail (20). More specifically, the projected rail (20) is formed as the body (11), the nose (18), and the tail (18) are projected upwardly from the top side. The binding hole (25) that allows the coupling with the binding (not illustrated) is formed on the top side.

The projected rail (20) is protruded from the body (11) and enables the user to glide in a space above the ground surface. This allows the user to elevate the center of gravity from the ground and implement various techniques by freely gaining the turning force.

Moreover, the multiple binding holes (25) are formed on the projected rail (20) in a specific interval so that the user can adjust the positions where he wears the binding and boots. As the projected rail (20) itself serves as a rib to strengthen the durability of the body (11), the overall strength and durability against bending of this snow sliding apparatus can be improved.

In this embodiment, two projected rails (20) are formed side by side on the body (11). To be more precise, both ends of the projected rail (20) are extended to reach the projected portion (31) of the first concavo-convex part (30), which will be explained below. Therefore, the space between the pair of the projected rails (20) is lower than the adjacent area and may have the convergence portion (33) of the first concavo-convex part (30), which will be explained later. In this case, while the user is gliding, snow will flow in between the pair of projected rails (20) and flow out to the rear.

The first concavo-convex part (30) may be formed on one end of the nose (18) or the tail (18). The concavo-convex part is formed to have the part of the nose (18) or the tail (18) converge into the inner part, which allows the user on this snow sliding apparatus to have a greater friction force and a turning force, use more various techniques, and have a shorter braking distance.

In the present embodiment, the first concavo-convex parts (30) may be formed on the nose (18) and the tail (18) or the first concavo-convex part (30) may be formed on either of the nose (18) or the tail (18). Since the first concavo-convex parts (30) on the nose (18) and the tail (18) have similar shapes, they are described herein based on the first concavo-convex part (30) formed on the nose (18).

The first concavo-convex part (30) includes the convergence portion, where the part of the nose (18) or the tail (18) converges into, and the projected portions (31) that are protruded on both ends of the convergence portion (33). In other words, the convergence portion (33) is located between the pair of the projected portions (31) and the convergence portion (33) and the projected portions (31) are formed in a way that makes the exterior a continuous curve.

The convergence portion (33) enables the user to implement more various motions and techniques because it broadens the area of friction against snow during sliding via the form converged into the inner side, facilitates the discharge of the rubbed snow between the convergence portions, and helps the user insert an object in between the convergence portions (33).

In order to maximize such functionalities, the preferred location of the convergence portion (33) is in between the projected rails (20). The convergence portion (33) is connected in the space between the projected rails (20), which are lower than the adjacent area, to freely discharge the rubbed snow.

That is, in a normal snowboard, the size of the side cut that converged into the side determines a turning radius while in the snow sliding apparatus but in this invention, the user applies forces to the nose or the tail while sliding and the forces are given to the snow surface, making the projected portion (31) or convergence portion (33) rub the snow or break the snow on the friction side instantly, which would elevate resistance and maximize the inertial turning force or performance by speed control and braking.

Figure 4:
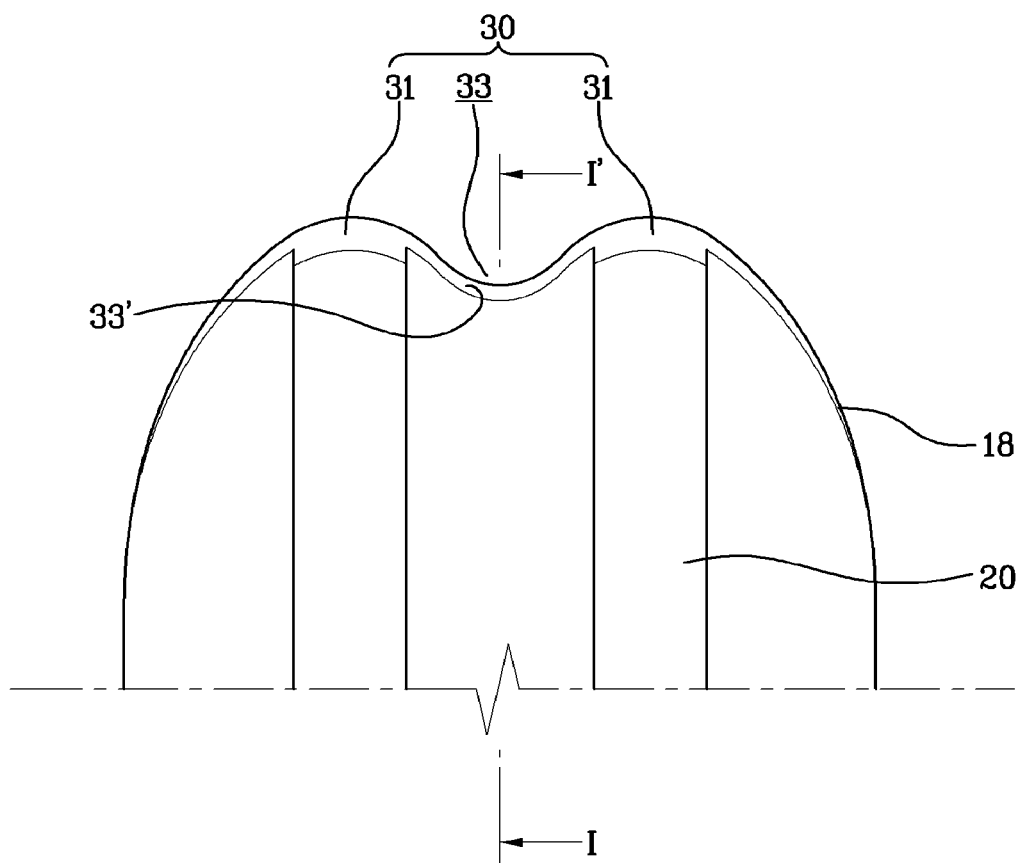
FIG. 4 is a plane view showing the configuration of the first concavo-convex part comprising the embodiment of this invention.
Figure 5:
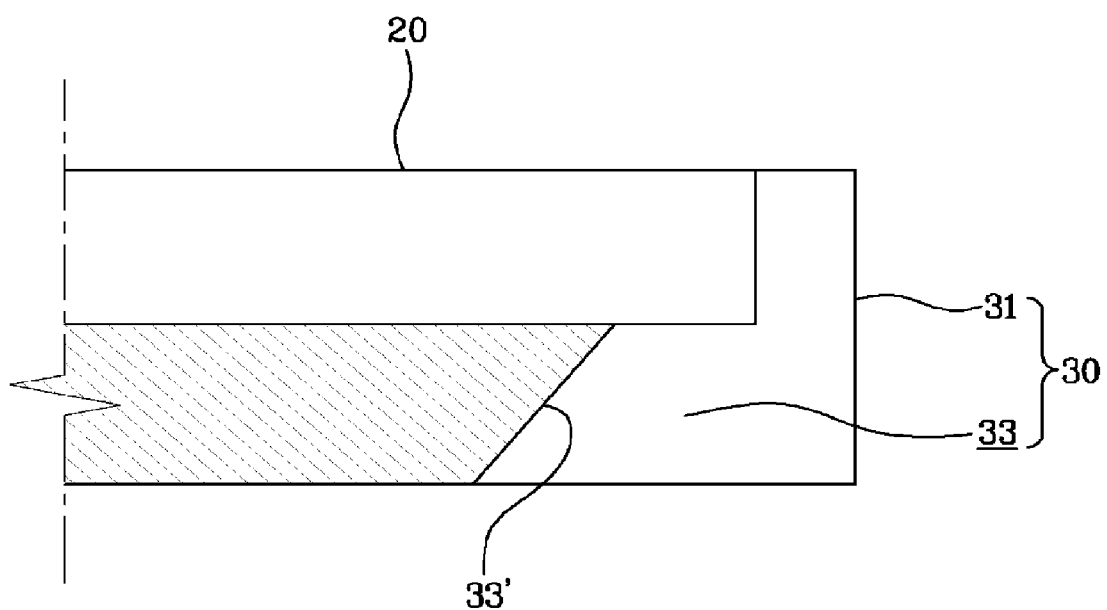
FIG. 5 is a cross-sectional view about the I-I' line of FIG. 4.

As seen in FIG. 5 illustrating the cross-sectional view about the I-I' line of FIG. 4, the slope part (33') is formed on the exterior of the projected portion (33). This makes the exterior of the projected portion (33) face the snow surface via the slope part (33') to facilitate friction between the snow sliding apparatus and the snow surface. In this embodiment, the slope part (33') is inclined upwards but the tilt angle of the slope part (33') may vary according to conditions or purposes.

In the present embodiment, one convergence portion (33) is formed in the nose (18) but as shown in FIG. 6 (a), the first concavo-convex part (30) may have two or more convergence portions on the nose (18) and the forms may vary as seen in FIG. 6 (b).

In the meantime, the preferred length of the body (11) is 40 cm~70 cm and the preferred height of the bent end of the nose (18) and the tail (18) is 1.0 cm~4.0 cm. If the body (11) is longer than 70 cm, the snow sliding apparatus may not perform as a ski board and if the distance between the ground and the bent ends of the nose (18) and the tail (18) is 1.0 cm or shorter, the nose (18) and the tail (18) may burrow into the snow surface and if it is 4.0 cm or higher, it is difficult for the first concavo-convex part (30) to have friction against the snow surface.

Moreover, it is desirable to have the body (11), the nose (18), the tail (18), and the first concavo-convex part (30) in one piece made of metal. Metal materials with a very low coefficient of elasticity and high strength are recommended.

The FIG. 9 shows how the snow sliding apparatus of this invention is used on the snow surface. Binding and boots are coupled with the snow sliding apparatus but they are not illustrated in this figure.

Thus, the user of the snow sliding apparatus can create friction with the snow surface by tilting either side of the nose (18) or the tail (18) towards the snow surface while sliding on the snow surface and in the process of it, the first concavo-convex part (30) increases friction against the snow surface to improve brake performance or enhance the turning force, allowing the implementation of more various techniques.

Especially, the friction by the first concavo-convex part (30) allows the user to brake in a sliding motion towards the longitudinal direction of the snow sliding apparatus without having to turn the snow sliding apparatus to make the longitudinal direction lie at right angles to the sliding direction to stop sliding.

Also, when an object is used, the user can insert the concavo-convex part (33) between the objects to slide, making the implementation of techniques safer and clearer.

It is evident that the right of this invention is not limited to the explained embodiments and is defined in the claims and the person who has common knowledge in the area of this invention can make transform and modify the apparatus in many diverse ways within the scope of the right stated in the claims.

In the embodiments, putting two pieces of snow sliding apparatus on both feet of the users is taken as an example but this invention can apply to the case where the user puts both feet on a single deck.

Figure 7:
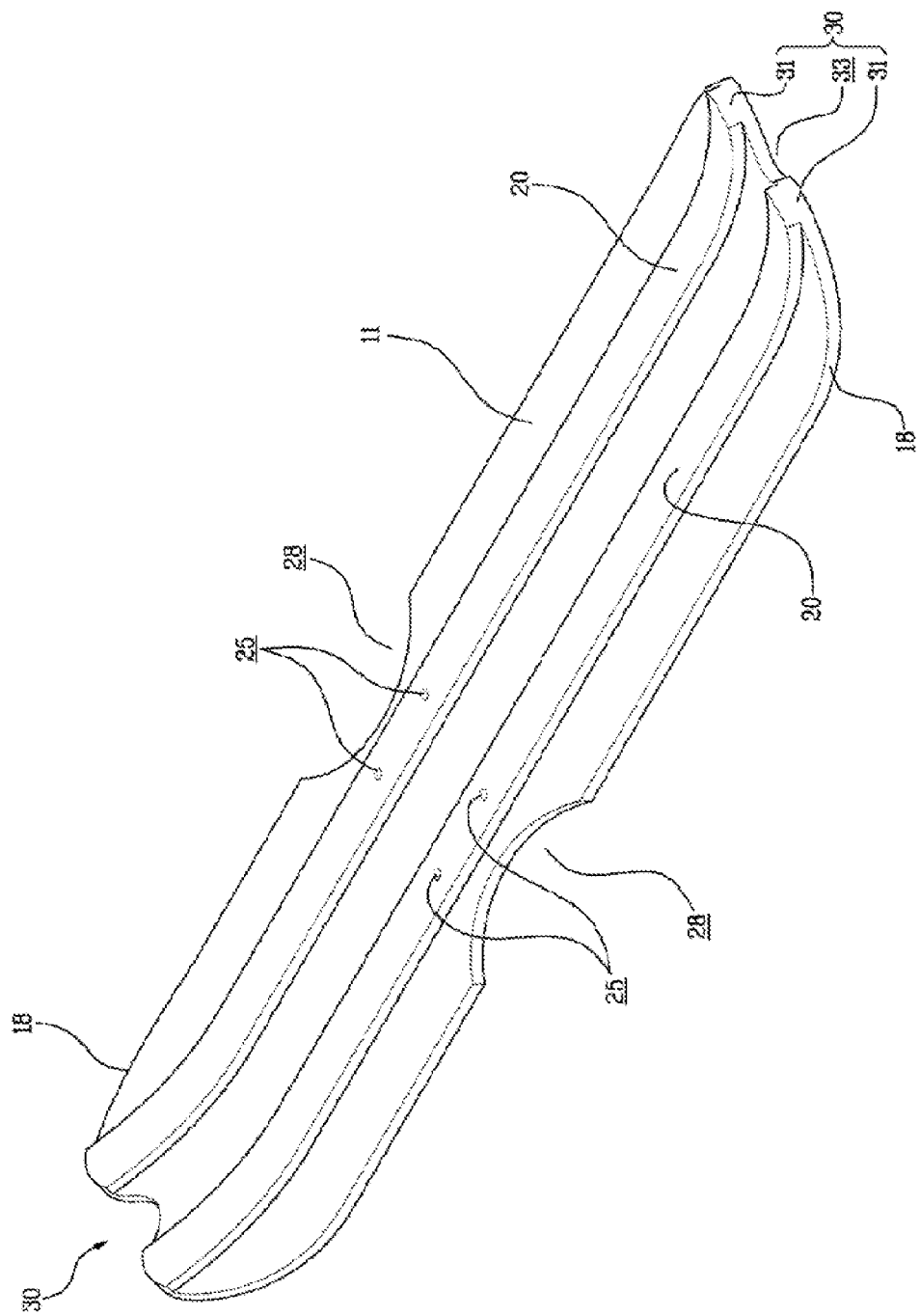
FIG. 7 is a perspective view showing the configuration of another embodiment of the snow sliding apparatus in this invention.

For example, as shown in FIG. 7, the body (11) may have the second concavo-convex part (28) in addition to the first concavo-convex part (30). The second concavo-convex part

(28) is formed when the side of the body is converged and as illustrated, it may take a circular arc or a semicircular shape or a triangular or a tetragon shape.

When the second concavo-convex part (28) takes the form of a circular arc or a semicircle, it is desirable to make it part of a virtual circle or semicircle with the radius of 30 cm~80 cm.

This kind of the second concavo-convex part (28) is formed on at least one side of both sides of the body (11) to allow the user to insert the object in the second concavo-convex part and implement more various techniques.

Also as illustrated in FIG. 8, the dummy spacer (40) is selectively coupled with the first concavo-convex part (30) to fill the convergence portion (33) and the corresponding coupling piece (43) and the coupling slit (34) are formed and pressed in the inner side of the dummy spacer (40) and first concavo-convex part (30). Though not illustrated, the dummy spacer (40) can be coupled with the first concavo-convex part (30) by a separate fastener. The second concavo-convex part (28) can also be filled selectively by the dummy spacer (40).

Since the first concavo-convex part (30) and the second concavo-convex part (28) can be selectively filled by the dummy spacer (40), the user can use the functionalities by using the first concavo-convex part (30) and the second concavo-convex part (28) or use it as a normal snow sliding apparatus by coupling it with the dummy spacer (40).

It is desirable to have the front side of the dummy spacer make a continuous flat surface to the exterior of the body adjacent to it and form a smooth exterior without a trace of the first concavo-convex part (30) or the second concavo-convex part (28). This is to ensure the functionality as normal snow sliding apparatus when it is coupled with the dummy spacer (40).

What is claimed is:

1. A snow sliding device enabling sliding on the snow surface characterized in that comprising:
    a body in a flat shape that is extended in one direction,
    a nose and a tail that are bent and extended from both ends of the body in a direction that is away from a ground surface,
    a first concavo-convex part that is formed in a way that one end of the nose or the tail converges into the inner side,
    the body, nose, tail, and first concavo-convex part that come in one piece made of metal, and
    the body that is 1.0 cm~2.5 cm thick and 40 cm~70 cm long from the nose to the tail,
    wherein the first concavo-convex part comprising:
    a convergence portion where part of the nose or the tail converges, and
    a projected portion that is relatively protruded on both ends of the convergence portion,
    wherein a projected rail is protruded upwards on the top sides of the body, nose, and tail and a binding hole is formed on the projected rail for coupling with a binding
    wherein one part of the projected rail is extended to the projected portion of the first concavo-convex part.

2. The snow sliding apparatus as claimed in claim 1, wherein one convergence portion is formed on one end of the nose or the tail or multiple convergence portions are formed continuously.

3. The snow sliding apparatus as claimed in claim 2, wherein a slope part is formed on the exterior of the convergence portion that is inclined to the snow surface.

4. The snow sliding apparatus as claimed in claim 1, wherein the height from the ground to the bent end of the nose or tail is 1.0 cm~4.0 cm.

5. The snow sliding apparatus as claimed in claim 1, wherein a plurality of binding holes are formed along the projected rail.

6. The snow sliding apparatus as claimed in claim 5, wherein a dummy spacer is selectively combined with the first concavo-convex part to fill the convergence portion, and
    wherein the dummy spacer and the first concavo-convex part are coupled by a corresponding coupling piece and coupling slit that are respectively formed in the inner side of the dummy spacer and the first concavo-convex part.

7. The snow sliding apparatus as claimed in claim 6, wherein the front side of the dummy spacer is continuous with a flat surface of the exterior side of the body adjacent to it.

* * * * *